United States Patent
Hanson et al.

(10) Patent No.: US 7,251,097 B2
(45) Date of Patent: Jul. 31, 2007

(54) WRITTEN-IN ERROR COMPENSATION METHOD FOR COHERENT REPEATABLE RUNOUT

(75) Inventors: Reed David Hanson, Chaska, MN (US); John Christopher Morris, Minneapolis, MN (US); Thomas Christopher Zirps, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 767 days.

(21) Appl. No.: 10/136,229

(22) Filed: May 1, 2002

(65) Prior Publication Data

US 2003/0112545 A1    Jun. 19, 2003

Related U.S. Application Data

(60) Provisional application No. 60/342,040, filed on Dec. 18, 2001.

(51) Int. Cl.
*G11B 5/596* (2006.01)
(52) U.S. Cl. .................................. 360/77.04
(58) Field of Classification Search ............. 360/77.04, 360/77.08, 75, 77.05, 78.14
See application file for complete search history.

(56) References Cited

U.S. PATENT DOCUMENTS

| | | | |
|---|---|---|---|
| 5,132,854 A * | 7/1992 | Tsuyoshi et al. | 360/78.14 |
| 5,550,685 A * | 8/1996 | Drouin | 360/77.08 |
| 5,793,559 A | 8/1998 | Shepherd et al. | |
| 5,825,578 A * | 10/1998 | Shrinkle et al. | 360/77.08 |
| 5,886,846 A * | 3/1999 | Pham et al. | 360/78.04 |
| 5,949,605 A | 9/1999 | Lee et al. | |
| 5,978,169 A | 11/1999 | Woods | |
| 6,049,440 A * | 4/2000 | Shu | 360/77.04 |
| 6,069,764 A | 5/2000 | Morris et al. | |
| 6,310,742 B1 * | 10/2001 | Nazarian et al. | 360/77.04 |
| 6,437,936 B1 * | 8/2002 | Chen et al. | 360/77.04 |
| 6,493,173 B1 * | 12/2002 | Kim et al. | 360/77.04 |
| 6,510,017 B1 * | 1/2003 | Abdelnour | 360/77.04 |
| 6,545,835 B1 * | 4/2003 | Codilian et al. | 360/77.04 |
| 6,563,663 B1 * | 5/2003 | Bi et al. | 360/77.04 |
| 6,654,198 B2 * | 11/2003 | Liu et al. | 360/77.04 |
| 6,657,810 B1 * | 12/2003 | Kupferman | 360/77.04 |
| 6,707,635 B1 * | 3/2004 | Codilian et al. | 360/77.04 |
| 6,765,748 B2 * | 7/2004 | Shu | 360/77.04 |
| 6,768,609 B2 * | 7/2004 | Heydt et al. | 360/77.08 |
| 6,775,091 B1 * | 8/2004 | Sutardja | 360/77.04 |

OTHER PUBLICATIONS

Seagate Technology LLC, "Compression and Storage of Written-In Error Compensation Tables In An Embedded Servo Disc Drive," U.S. Appl. No. 09/781,363, p. 33, filed Feb. 12, 2001.

* cited by examiner

*Primary Examiner*—Fred F. Tzeng
(74) *Attorney, Agent, or Firm*—Westman, Champlin & Kelly

(57) ABSTRACT

The present invention recognizes that induced RRO is coherent, i.e., the RRO has a large degree of repeatability from track to track. The present invention is a zero acceleration profile (compensation) process that targets CRRO (Coherent RRO). A process of the present invention represents a considerable reduction in the factory calibration time compared to other compensation techniques currently used. The reduction in time is attributed to the fact that CRRO can be computed by averaging position error signals (PES) over multiple tracks as opposed to total RRO which is computed by averaging over multiple revolutions on the same track.

22 Claims, 5 Drawing Sheets

US 7,251,097 B2

WRITTEN-IN ERROR COMPENSATION METHOD FOR COHERENT REPEATABLE RUNOUT

RELATED APPLICATIONS

This application claims priority to U.S. Provisional Application No. 60/342,040 filed Dec. 18, 2001, entitled "WRITTEN-IN ERROR COMPENSATION METHOD THAT ADDRESSES COHERENT REPEATABLE RUNOUT."

FIELD OF THE INVENTION

This invention relates generally to the field of data storage, and more particularly, but not by way of limitation, to runout compensation.

BACKGROUND

Disc drives read and write information along concentric tracks formed on discs. To locate a particular track on a disc, disc drives typically use embedded servo fields on the disc. These embedded fields are utilized by a servo sub-system to position a head over a particular track. The servo fields are written onto the disc when the disc drive is manufactured and are thereafter simply read by the disc drive to determine position.

Ideally, a head following the center of a track moves along a perfectly circular path around the disc. However, two types of errors—known as repeatable runout (RRO) and non-repeatable runout (NRRO) prevent heads from following this ideal path. A position error is considered to be RRO if the same error occurs each time the head passes a particular circumferential location on the disc. The portion of the total position error that is not RRO is considered NRRO. This invention relates to reducing errors associated with RRO. RRO can further be decomposed into two types. The first type of RRO error is a written-in error that arises during the creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Other sources of written-error exist. Because of these written-in errors, a head that perfectly tracks the path followed by the servo write head will not follow a circular path.

The second type of RRO error that prevents circular paths is induced repeatable runout. Briefly, RRO is induced during the head-disk assembly (HDA) build process due to disk clamping distortion and spindle runout. The level of induced RRO can be quite large. Therefore, the total level of RRO (written-in and induced) in drives with prewritten media may exceed the RRO budget, requiring some form of RRO compensation.

Written-in error compensation techniques are commonly used within the disk drive industry to reduced servo tracking errors associated with RRO. Some compensation techniques involve a factory calibration process to generate correction tables for each track. These tables are written to the disk and used by the servo subsystem to compensate for the RRO, thereby reducing tracking errors. This factory process can be time consuming and costly, requiring several hours of factory calibration time per drive.

A further factor to be considered is the increasing tracks per inch (TPI) of disc drives. To meet the demands of higher TPI capability, servo-track writing is undergoing a fundamental change: In the near future, servo tracks will be prewritten or preformatted outside the HDA. One such method would be the use of a multi-disk writer (MDW). The written-in level of RRO on prewritten or preformatted media may be sufficiently small so that the compensation techniques described above are not required, resulting in considerable time and cost savings. However, as explained above, the additional induced RRO can be quite large. Therefore, the total level of RRO (written-in and induced) in drives with prewritten media may exceed the RRO budget, requiring some form of RRO compensation. If die compensation techniques describe above are used to bring the total RRO down to the required level, the factory calibration process used for prewritten or preformatted media would remain costly.

SUMMARY OF THE INVENTION

The present invention recognizes that induced RRO is coherent, i.e., the RRO has a large degree of repeatability from track to track. The present invention is a zero acceleration profile (compensation) process that targets CRRO (Coherent RRO). A process of the present invention represents a considerable reduction in the factory calibration time compared to other compensation techniques currently used. The reduction in time is attributed to the fact that CRRO can be computed by averaging position error signals (PES) over multiple tracks as opposed to total RRO which is computed by averaging over multiple revolutions on the same track.

Another aspect of the present invention uses a zoning technique that lends itself to storing the compensation tables in RAM as opposed to storing the compensation tables onto the disk itself. Using this RAM-based approach, the compensation time can be further reduced by eliminating two rotations per track that are associated with writing the compensation tables to the disk and verifying that the tables are written correctly. Storing the compensation tables in RAM would also result in improved disc format efficiency.

These and various other features and advantages, which characterize the present invention, will be apparent from a reading of the following detailed description and a review of the associated drawings.

DETAILED DESCRIPTION

Figure 1:
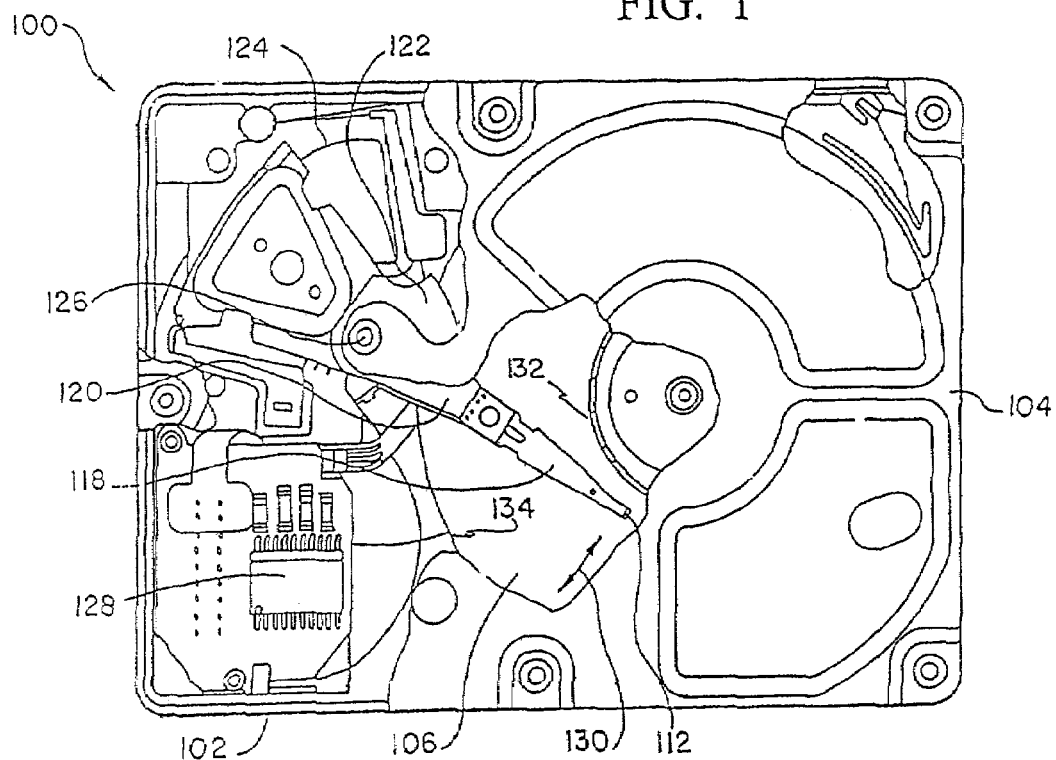
FIG. 1 is a plan view of a disc drive of the present invention.

While this invention is susceptible of embodiment in many different forms, there is shown in the drawings and will be described herein in detail specific embodiments thereof with the understanding that the present disclosure is to be considered as an exemplification of the principles of the invention and is not to be limited to the specific embodiments described.

FIG. 1 is a plan view of a disc drive 100 that includes a housing with a base plate 102 and a top cover 104 (sections of top cover 104 are removed for clarity). Disc drive 100 further includes a disc pack 106, which is mounted on a spindle motor (not shown). Disc pack 106 can include a plurality of individual discs which are mounted for co-rotation about a central axis. Each disc surface has an associated head gimbal assembly (HGA) 112 which is mounted to disc drive 100 for communication with the disc surface. Each HGA 112 includes a gimbal and a slider, which carries one or more read and write heads. Each HGA 112 is supported by a suspension 118 which is in turn attached to a track accessing arm 120 known generally as a fixture, of an actuator assembly 122.

Actuator assembly 122 is rotated about a shaft 126 by a voice coil motor 124, which is controlled by servo control circuitry within internal circuit 128. HGA 112 travels in an arcuate path 130 between a disc inner diameter 132 and a disc outer diameter 134. When the head is properly positioned, write circuitry within internal circuitry 128 encodes data for storage on the disc and sends an encoded signal to the head in HGA 112, which writes the information to the disc. At other times, the read head in HGA 112 reads stored information from the disc and provides a recovered signal to detector circuitry and decoder circuitry within internal circuitry 128 to produce a recovered data signal.

Figure 2:
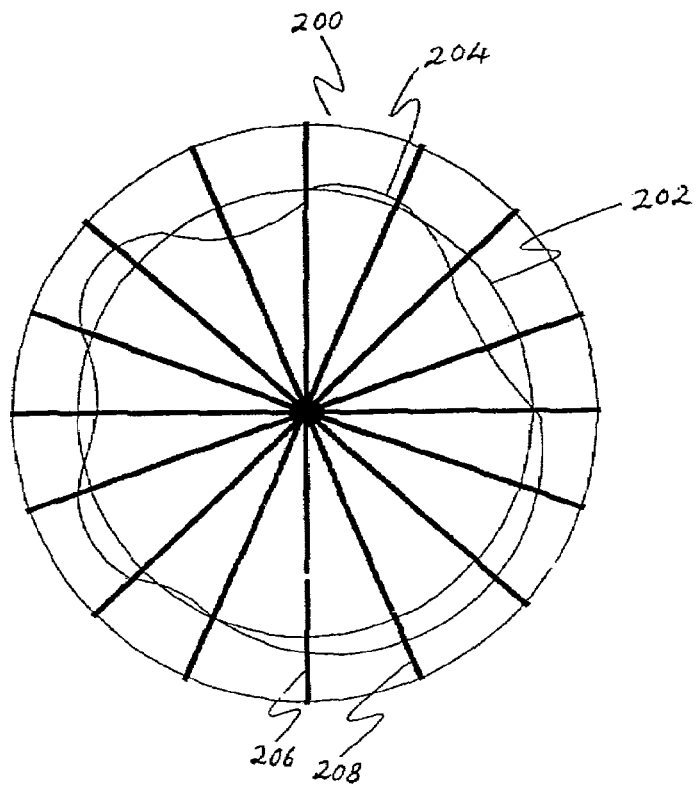
FIG. 2 is a top view of a section of a disc showing an ideal track and a realized written-in track.

FIG. 2 is a top view of a section 200 of a disc showing an ideal, perfectly circular track 202 and an actual track 204. Section 200 includes a plurality of radially extending servo fields such as servo fields 206 and 208. The servo fields include servo information that identifies the location of actual track 204 along disc section 200.

Any variation in the position of a head away from circular track 202 is considered a position error. The portions of track 204 that do not follow circular track 202 create repeatable run-out position errors. A position error is considered a repeatable runout error if the same error occurs each time the head passes a particular circumferential location on the disc. Track 204 creates a repeatable runout error because each time a head follows the servo fields that define track 204, it produces the same position error relative to ideal track 202. As mentioned earlier, the repeatable RRO can be further decomposed into the written-in and induced RRO. The induced RRO is largely coherent RRO, and will be referred to as CRRO here after.

Under the present invention, a head attempting to write to or read from track 204 will not follow track 204 but instead will more closely follow perfectly circular track 202. This is accomplished using a compensation signal that at least minimizes the servo system from tracking repeatable run-out errors resulting from the irregular shape of track 204.

Figure 3:
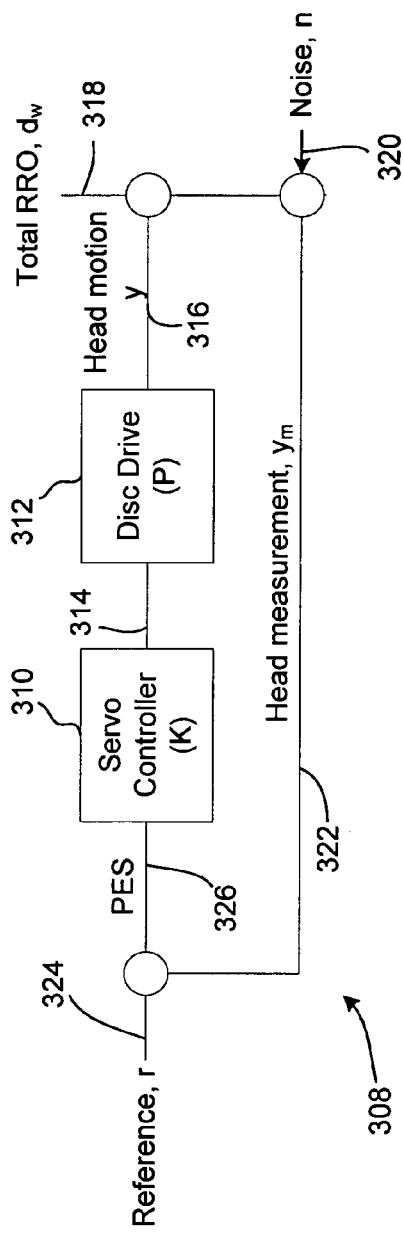
FIG. 3 is a block diagram of a prior art servo loop.

FIG. 3 is a block diagram of a servo loop 308. The servo loop includes a servo controller 310, having a gain of "K" and a disc drive 312 having a gain of "P". Servo controller 310 is the servo control circuitry within internal circuit 128 of FIG. 1. Disc drive 312 includes actuator assembly 122, voice coil motor 124, track accessing arm 120, suspension 118, and head gimbal assembly 112, all of FIG. 1.

Servo controller 310 generates a control current 314 that drives the voice coil motor of disc drive 312. In response, disc drive 312 produces head motion 316. In FIG. 3, the total RRO, $d_w$, is represented as a separate input signal 318 even though the total RRO would otherwise appear implicitly in head motion 316. The total RRO, $d_w$, includes the written-in error and the CRRO. The separation of total RRO 318 from head motion 316 provides a better understanding of the present invention. In addition, noise in the servo system has been separated and appears as noise 320, which is added to the head motion. The sum of head motion 316, total RRO 318 and noise 320 results in the head's servo measurement signal 322. Servo measurement signal 322 is subtracted from a reference signal 324, which is generated by internal circuitry 128 based on a desired location for the head. Subtracting head measurement 322 from reference signal 324 produces position error signal 326 which is input to servo controller 310.

Heads in the servo loop of FIG. 3 move in response to CRRO. This movement is undesirable since it places the head outside of the ideally circular track path (see FIG. 2). Further, because the transfer function of the servo loop of FIG. 3 is frequency dependent, the transfer function suffers from peaking at certain frequencies. This peaking causes even greater position errors because it amplifies the written-in error at certain frequencies.

Figure 4:
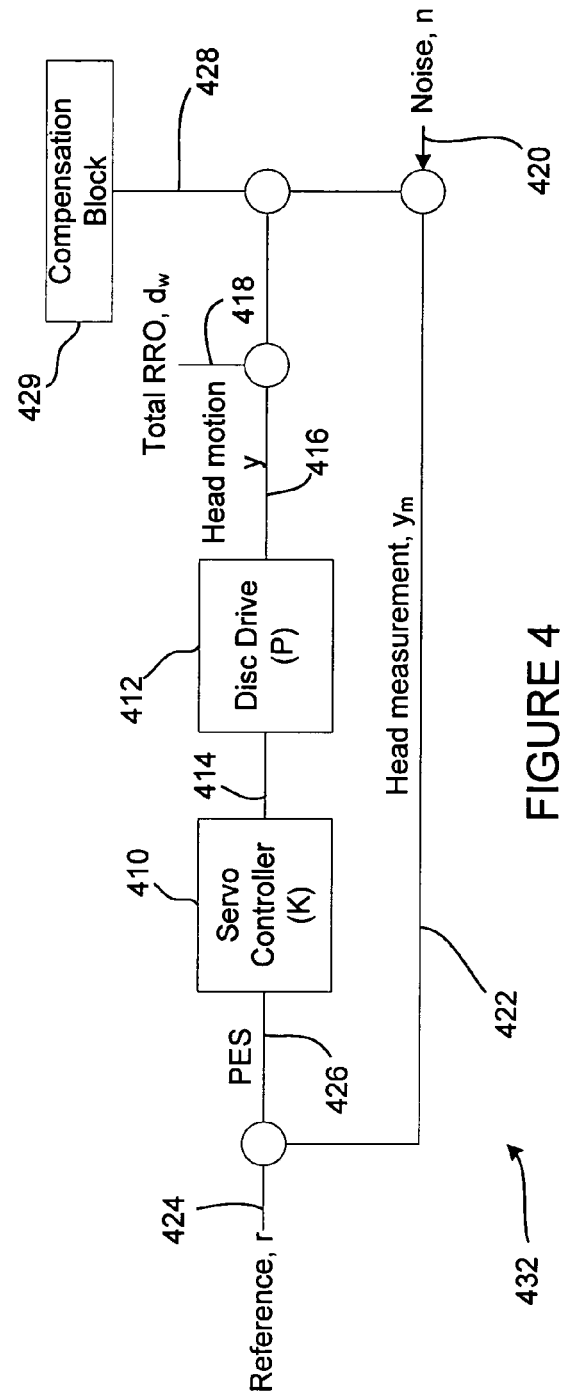
FIG. 4 is a block diagram of a servo loop of the present invention.

To eliminate the unwanted head motion created by the CRRO, the present invention adds a compensation signal to the servo loop of FIG. 3. This added signal is shown in servo loop 432 of the present invention, which is shown in FIG. 4. The compensation signal added to the servo loop is compensation signal 428, which is produced by compensation circuitry 429. In FIG. 4, compensation signal 428 is inserted after the summation of total RRO 418 and head motion 416. However, those skilled in the art will recognize that the compensation signal can be added at other locations within the servo loop.

The compensation signal injected into the servo loop of the present invention is a time-domain signal. Preferably, this time-domain signal is determined using the frequency domain relationship (explained below) to produce a frequency-domain compensation signal and transforming the resulting frequency-domain compensation signal into a time-domain compensation signal. The method of the present invention for determining the time-domain compensation signal is shown in FIG. 5.

Figure 5:
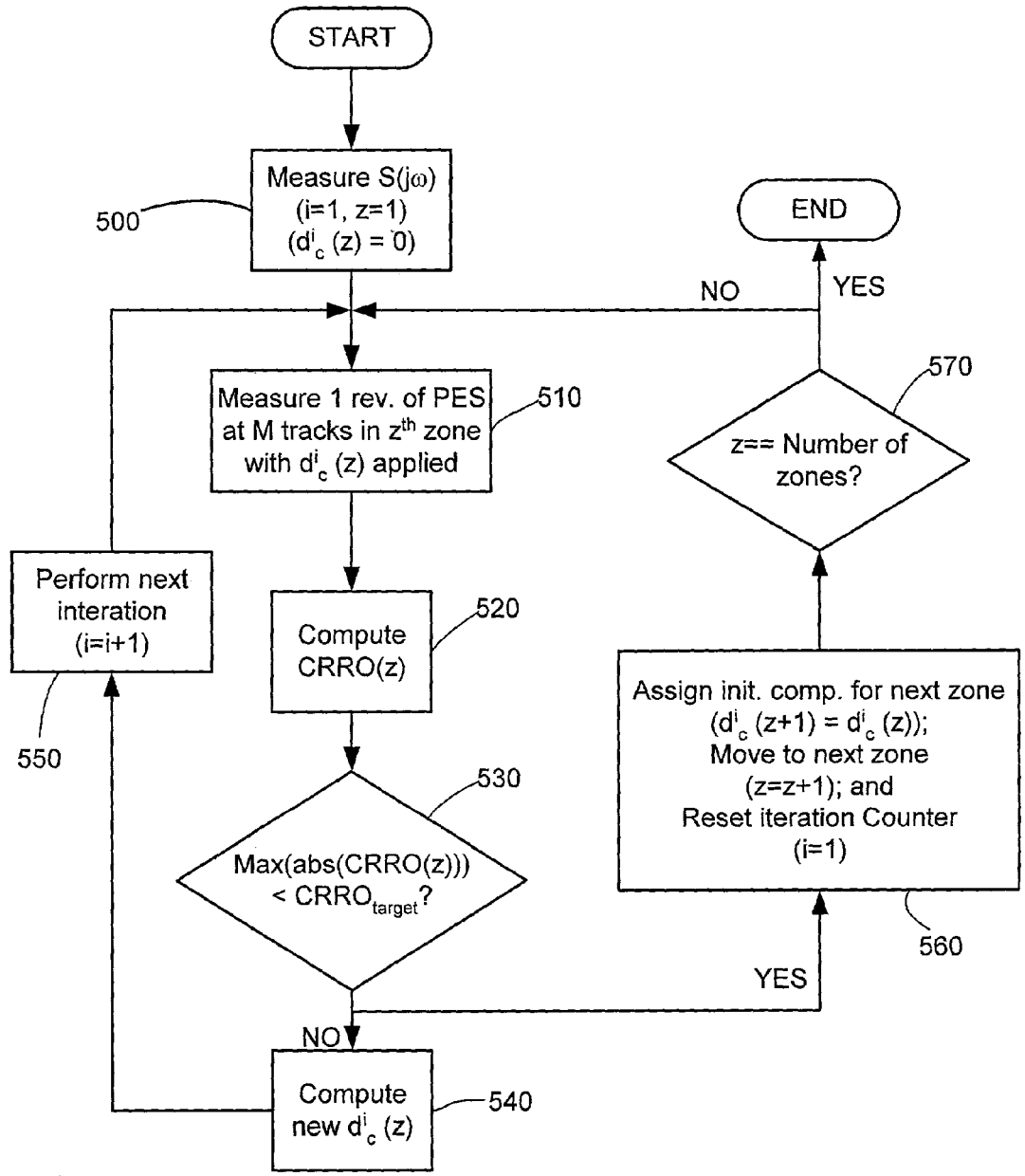
FIG. 5 is a flow chart representing a method of the present invention.

The present invention provides a CRRO compensation process shown in the flow chart of FIG. 5. A first step 500 in this process is to measure $S(j\omega)$ at selected frequencies, the closed-loop sensitivity (or transfer) function, which can be expressed $$S(j\omega) = \frac{1}{1 + P(j\omega)K(j\omega)} \quad (1)$$

where P represents the gain of the actuator dynamics and K represents the gain of the controller. The iteration variable i and the zone variable z are set to one, which variables will be explained below. A compensation profile $d^i_c(z)$ is initialized to zero. This transfer function can be measured using known techniques. Essentially, these techniques inject a disturbance into the servo system and measure a resulting signal within the servo system. The ratio of the injected signal to the measured signal provides the transfer function.

The transfer function measured in step 500 is preferably measured at selected frequencies. The selected frequencies are integral harmonics of the spindle frequency. The reason that the transfer function is only measured at the integral harmonics of the spindle frequency is that the repeatable run-out component of the position error measurement only has frequency components that are integral harmonics of the spindle frequency. This occurs because the repeatable run-out error is only measured at the servo fields, and the servo fields are equally spaced around the disc.

Thus, the lowest frequency that appears in the repeatable run-out signal is equal to the spindle frequency itself, and the highest frequency is equal to the spindle frequency times one-half the number of servo fields along a track. As those skilled in the art will recognize, the transfer function only needs to be measured for those frequencies that are integral harmonics of the spindle frequency between the spindle frequency and one-half the number of servo fields on the disc times the spindle frequency. For the present invention, the first and second harmonics (1f and 2f) are preferably not used. These two RRO frequencies may shift due to temperature and/or shock. Since that shifting can occur after the measurements of the present invention, including these frequencies may alter the efficiency of the present invention.

Once the transfer function has been measured at the selected frequencies, the method continues at step 510 where a time-domain sequence of repeatable run-out values is determined for a track. Step 510 measures the PES(k) at M equally spaced tracks in zone z. Here PES(k) represents one revolution of PES data on the $k^{th}$ track which can be expressed as $$PES(k) = \begin{Bmatrix} pes(0) \\ pes(1) \\ \vdots \\ pes(N-1) \end{Bmatrix} \quad (2)$$

where pes(n) is the position error reading on the $n^{th}$ servo sector. Then CRRO(z), the coherent RRO for the $z^{th}$ zone, is computed at step 520 as $$CRRO(z) = \frac{1}{M} \sum_{m=0}^{M-1} PES(Z_{start}(z) + m * Z_{inc}) \quad (3)$$

where M is the number of equally-spaced tracks, $Z_{start}(z)$ is the first track in zone z, m is the track number and $Z_{inc}$ is the spacing between the tracks averaged in the zone. Note that $Z_{inc}*M$ defines the width of the zone in terms of tracks. To explain Equation 3 by way of an example, assume two zones (i.e., z={1, 2}) and the start tracks for the two zones are tracks 0 and 1000 (i.e., $Z_{start}(1)=0$, $Z_{start}(2)=1000$). Also assume to average 10 tracks within each zone for the CRRO computation (i.e., M=10, $Z_{inc}=100$). Then PES(k) will be evaluated at each tenth track in each zone where k=$Z_{start}$(z)+m*$Z_{inc}$. In this example m={0, 1, . . . 9}. Equation 3 averages each respective servo of each track m to determine the CRRO for that sector in that zone. The present invention can use different parameters for equation 4. Sampling more tracks or using more revolutions per track can be used if more accurate determinations are desired.

The magnitude of the CRRO is then determined if it is less than a target CRRO at step 530. The target CRRO is predetermined, which can depend on a factor such as track-per-inch density. If not, a new compensation profile, $d^i_c(z)$, is computed at step 540 as $$CRRO(j\omega)=DFT\{CRRO(z)\} \quad (4)$$

where DFT {} is the Discrete Fourier Transform. Equation 4 converts the measured CRRO in the time domain to the frequency domain. Next used is $$\delta^i_c(j\omega)=CRRO(j\omega)/S(j\omega) \quad (5)$$

which removes the sensitivity factor of the servo loop from the measured CRRO to determine a derived compensation value. Used next is $$d_c^i(j\omega)=d_c^{i-1}(j\omega)+\Phi \times \delta_c^i(j\omega) \quad (6)$$

where $\Phi$ represents a gain that is set to a value between 0 and 1, and which Equation 6 determines the frequency-domain compensation values. With $\Phi$ ranging between 0 and 1, the amount of the derived compensation value influencing the compensation values can be controlled. Then used next is $$d_c^i(z)=DFT^{-1}\{d_c^i(j\omega)\} \quad (7)$$

where $DFT^{-1}$ {} is the inverse Discrete Fourier Transform.

The new compensation table is applied to all tracks in the zone for the next iteration through step 550. When the condition of step 530 is satisfied, the process continues to the next zone. As shown at step 560, the initial compensation table used when entering zone z+1 is the final compensation table generated in zone z.

The memory required to store the compensation tables described using the above method is Memory (in bytes)=sectors/revolution*zones (8).

Figure 6:
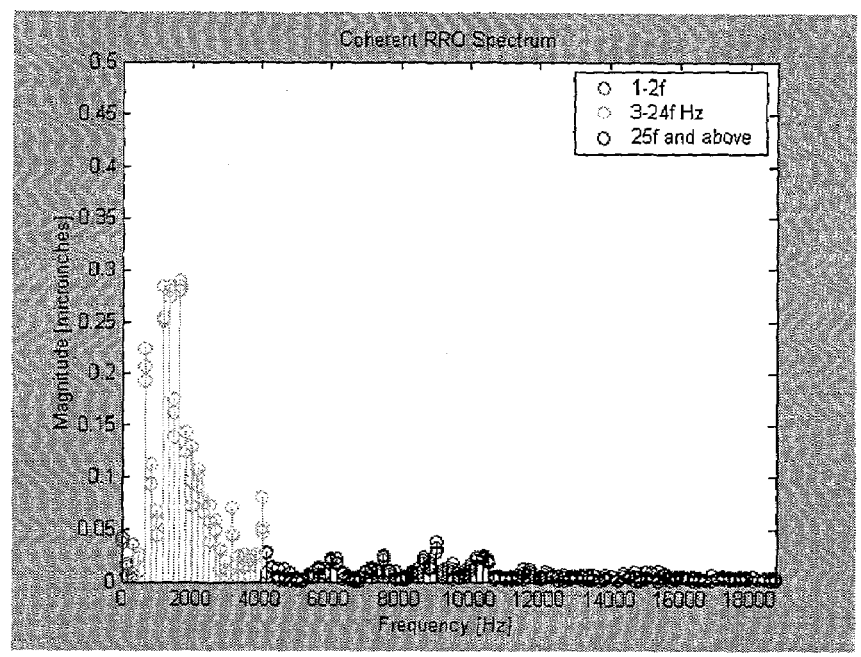
FIG. 6 is a spectrum analysis of coherent RRO not utilizing the present invention.
Figure 7:
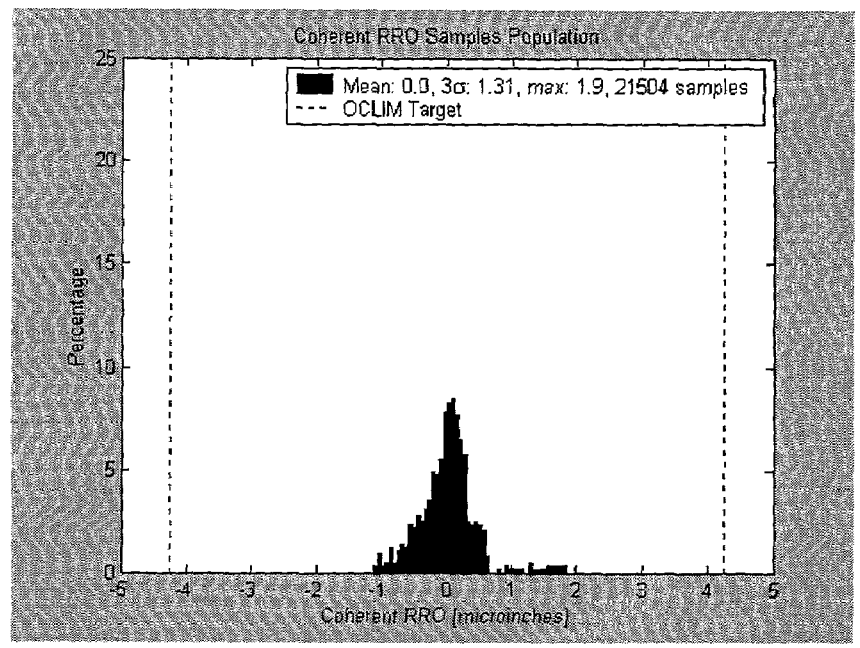
FIG. 7 is a histogram of coherent RRO not utilizing the present invention.
Figure 8:
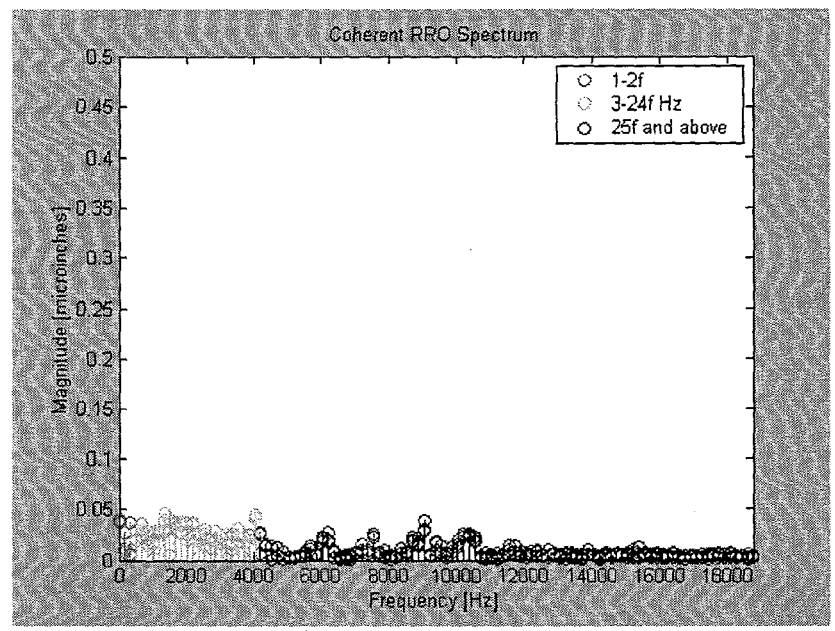
FIG. 8 is a spectrum analysis of coherent RRO utilizing the present invention.
Figure 9:
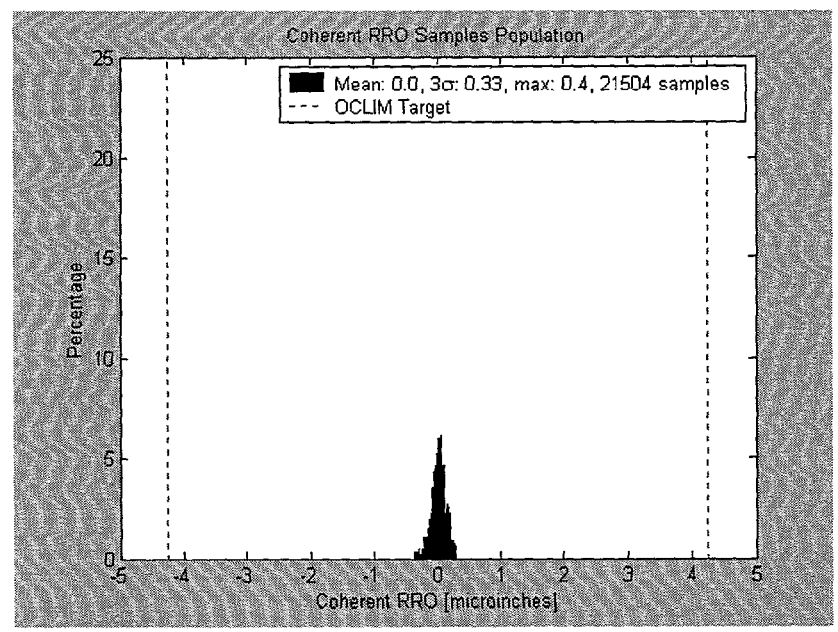
FIG. 9 is a histogram of coherent RRO utilizing the present invention.

However, since CRRO has most of its energy at the lower spindle harmonics (see FIG. 6), the method described below can be utilized to compress the data. The memory requirement using the above process in combination with the process reduces the memory requirements to Memory (in bytes)=2*number_of_harmonics_compensated*zones (9).

In more detail, if disc 200 has N servo sectors (206,208, etc.) on each track, the sample rate $f_s$ is defined as:

$$f_s=1/T_S=N \times RPM/60 \text{ Hz} \quad (10)$$

where $T_S$ is the sample period and RPM is the rotations per minute of the disc. One aspect of the invention includes the recognition that the written-in error is periodic, with a period of $T_S$ which equals 60/(N×RPM) seconds. Because the signal is periodic, the spectrum of the written-in error ($d_W$) is uniquely defined by a Fourier series with discrete line spectra:

$$d_w(t) = \sum_{m=-\infty}^{\infty} c_m e^{j\frac{2\pi m}{T_s}t} = c_0 + 2\sum_{m=1}^{\infty} |c_m|\cos\left(\frac{2\pi m}{T_s}t + \phi_M\right) \quad (11)$$

where $c_m$ is the Fourier coefficient for each frequency component. With the additional constraint that $d_w$ is discrete-time with N samples, results in the Fourier series consisting of only N harmonically related exponential functions. If the disc drive actuator is moving at frequencies which are above the Nyquist frequency ($f_s/2$ Hz), then these frequencies will be aliased below the Nyquist frequency when written into the disc surface. With this additional constraint, the spectrum of the written-in error, $d_w$, and the written-in correction, $d_c$ can be expressed as:

$$d_w(k) = \sum_{m=0}^{N-1} c_m e^{j\frac{2\pi m}{N}k} \quad (12)$$

$$d_c(k) = \sum_{m=0}^{N-1} b_m e^{j\frac{2\pi m}{N}k} \quad (13)$$

where $c_m$ are the Fourier coefficients of the written-in error $d_w$, and $b_m$ are the Fourier coefficients of the written-in compensation $d_c$.

Given these constraints an algorithm for estimating the spectrum of CRRO correction, $d_c$ (j$\omega$), and the resulting time-domain written-in repeatable run-out correction signal, $d_c(k)$, on a specified track and head, with data compression integral to the algorithm can be derived as shown below.

The specialized Discrete Fourier Transform (DFT) and its inverse carrying out calculations over a subset of harmonic frequencies defined on an index set $\Xi$ for a signal x is as follows:

$$x(j\omega) = DFT\{x(k)\}, = \sum_{k=0}^{N-1} x(k)xe^{-j\frac{2\pi km}{N}}, \omega = mx(\pi f_{spindle}), m \in \Xi \quad (14)$$

$$x(k) = DFT^{-1}\{x(j\omega)\}, = \frac{1}{N}\sum_{m \in \Xi} x(j2\pi f_{spindle})xe^{j\frac{2\pi km}{N}}, \quad (15)$$

$$k = 0, \ldots, N-1$$

where N is the number of servo sectors, k is a specific sector, $f_{spindle}$ is the spindle frequency in Hz and $\Xi$ is an index set of integers drawn from a subset of the integers 1 to N/2. This index set defines the frequencies of the written-in error that will be compensated. Because a reduced index set is used, the standard Fast Fourier Transform (FFT) algorithm is not employed, and instead, the specialized DFT is computed using the index set $\Xi$ in EQS. 11 and 12.

Based on EQS. 11 and 12, it can be seen that computation reduces from order $N^2$ to Ndim($\Xi$), where dim($\Xi$) is the dimension (or number of elements) of index set $\Xi$. The resulting written-in error compensation algorithm in accordance with the present invention based on the above definitions is shown in FIG. 5.

The above CRRO compensation process was tested on a drive that was built using prewritten media written on an MDW (Multi-Disk Writer). One side of a disk was processed using the above method. Prior to compensation using the present invention, the Max.-Abs. (maximum–absolute value) for the CRRO was measured to be 1.9 µin, with the CRRO largest at the inner diameter (ID).

The test parameters for the CRRO compensation process were:
  Number of zones: 46
  Zone track increment ($Z_{inc}$): 3
  Zone size: 627 tracks
  Harmonics compensated: 3 through 24
  Compensation Gain ($\Phi$): 0.4 µin
  CRRO$_{Target}$: 0.32 µin A summary of the results is as follows: The average number of revolutions of data acquired per track (which is directly related to calibration time) was 0.89 rev/track. The level of CRRO after the CRRO compensation was applied was reduced to below 1.5% of track pitch across the entire surface (3$\sigma$: 0.33 µin, Max–Abs: 0.40 µin). For comparison, another compensation process for the same type of drive uses approximately 13 rev/track, and reduces the total RRO to approximately 4% of track pitch (Max–Abs).

The highest level of CRRO occurred at the ID, both with and without the present invention compensation applied. Plots showing the CRRO spectrum and histogram without compensation correction are shown in FIGS. 3 and 4, respectively. This data was collected over the zone nearest the ID (i.e., over track 28842 to 29468). For comparison, similar plots are shown in FIGS. 4 and 5 with CRRO compensation of the present invention applied.

Using the technique described above, memory required to store the compensation tables generated by this process would be 2024 bytes (2 bytes/harmonic*22 harmonics*46 zones). This amount would allow the CRRO compensation tables in a 4-disk HDA to be stored in 16 k of RAM. Thus, the compensation tables do not have to be stored on the disc. In that case, format and overhead issues arise. The present invention eliminates those issues.

The present invention can use different parameters than those described above. For example, a different number of tracks per zone can be sampled and/or more revolutions per track can be used. A different gain $\Phi$ value can be used and can be fixed or variable. Also, a different range or ranges of harmonics can be compensated. The CRRO$_{Target}$ can be set to a different value.

The number of zones is preferably determined by reducing the number of zones until the target CRRO cannot be achieved. The number of zones depends on how rapidly the CRRO varies radially. This partly depends on the build process (that influences the level of disk clamping distortion leading to induced RRO). Preferably, enough zones are used so that the variation in the CRRO is small enough so that one compensation profile is suitable for the entire zone. It is desirable to keep the number of zones as small as possible for data storage, particularly in the case of a RAM-based approach for storing the CRRO compensation table. However, if the compensation tables are written to the disk, there is minimal advantage to using a smaller number of zones.

The zone track increment is determined with the objective to have the least amount of calibration time. The zones do not need to be uniform in size as shown in the embodiment described above. Using zones of variable width, narrow zones could be used where the variation in the CRRO is large, and large zones could be used were the variation in the CRRO is small. In this manner, a smaller number of zones could be used, and hence less data would need to be stored in RAM (if a RAM based approach was used).

If a RAM-based approach is used, the minimum number of harmonics are preferably included that still allows reducing the CRRO down to its target. If the tables are written to the disk, all the harmonics are preferably included, and the target CRRO can be achieved easier (less calibration time, i.e., less iterations).

The range of the compensation gain is preferably limited to be 0 and 1 (for stability). The gain also influences the calibration time as does the track increment, and can be determined experimentally, with the objective being the least amount of calibration time.

The compensation values can be saved at each servo preceding the servo to be compensated, in RAM, non-volatile memory or in an area on the disc that is either dedicated to the compensation values or is a non-user area.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application while maintaining substantially the same functionality without departing from the scope of the claims of the present invention. Moreover, although the invention is described herein is directed to rotatable disc drives, it will be appreciated by those skilled in the art that the teachings of the present invention can be applied to linear devices, including tape drives, where repeatable runout exists, without departing from the scope and spirit of the invention.

What is claimed is:

1. A method of compensating for runout comprising the step of computing repeatable runout by averaging position error signals over multiple tracks.

2. The method of claim 1 wherein the repeatable runout is coherent.

3. The method of claim 2 wherein the multiple tracks are included in a zone.

4. The method of claim 3 wherein additional zones are used, a number of zones is determined by reducing the number of zones until a target coherent repeatable runout cannot be achieved.

5. The method of claim 3 wherein a number of tracks in the zone is determined responsive to a target coherent repeatable runout.

6. The method of claim 2 wherein a plurality of zones are used, each zone containing multiple tracks.

7. The method of claim 6 wherein the plurality of zones includes a large zone and a narrow zone.

8. The method of claim 2 wherein the tracks are equally spaced.

9. The method of claim 2 wherein a plurality of harmonics are compensated.

10. The method of claim 2 wherein compensation values for compensating for the coherent repeatable runout are compressed for storage.

11. A method for compensating for runout of a storage device comprising:

determining coherent repeatable runout for a plurality of servos in a zone, each servo being on a different track, based at least in part on averaging position error signals from the different tracks;

storing a compensation value corresponding to the coherent repeatable runout; and using the compensation value to compensate for the coherent repeatable runout.

12. The method of claim 11 wherein the using step includes injecting the compensation values into a servo loop.

13. The method of claim 12 wherein all the steps are iterated until the coherent repeatable runout is less than a predetermined coherent repeatable runout error.

14. The method of claim 11 wherein the storing step stores the compensation values in RAM.

15. The method of claim 11 wherein the determining step includes determining a coherent repeatable runout for at least one sector in a zone.

16. The method of claim 15 wherein the coherent repeatable runout is determined by averaging the position error signal of corresponding sectors in a zone.

17. The method of claim 11 wherein the compensation values are used initially for an adjacent zone.

18. A servo loop adapted to use compensation values, each compensation value determined at least in part by averaging position error signals from corresponding sectors in different tracks, to compensate for repeatable runout.

19. The servo loop of claim 18 wherein the repeatable runout is coherent.

20. The servo loop of claim 19 wherein a compensation value is injected into the servo loop to compensate for the coherent repeatable runout of corresponding sectors in a zone.

21. The servo loop of claim 20 wherein the compensation value is determined from averaging the position error signals for the corresponding sectors in the zone.

22. A disc drive including the servo loop of claim 19.

* * * * *